(12) United States Patent
Shnitko et al.

(10) Patent No.: US 10,693,947 B2
(45) Date of Patent: Jun. 23, 2020

(54) INTERCHANGEABLE RETRIEVAL OF SENSITIVE CONTENT VIA PRIVATE CONTENT DISTRIBUTION NETWORKS

(71) Applicant: Microsoft Technology Licensing, LLC, Redmond, WA (US)

(72) Inventors: Yauhen Shnitko, Sammamish, WA (US); John D. Fan, Redmond, WA (US); Victor Magidson, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 515 days.

(21) Appl. No.: 15/402,071

(22) Filed: Jan. 9, 2017

(65) Prior Publication Data

US 2018/0077222 A1  Mar. 15, 2018

Related U.S. Application Data

(60) Provisional application No. 62/385,801, filed on Sep. 9, 2016.

(51) Int. Cl.
*G06F 15/16* (2006.01)
*H04L 29/08* (2006.01)
*H04L 29/06* (2006.01)

(52) U.S. Cl.
CPC ........ *H04L 67/10* (2013.01); *H04L 29/08729* (2013.01); *H04L 65/4084* (2013.01);
(Continued)

(58) Field of Classification Search
CPC .. G06F 16/152; G06F 16/1734; G06F 16/178; G06F 21/604; H04L 67/1095;
(Continued)

(56) References Cited

U.S. PATENT DOCUMENTS 6,823,377 B1  11/2004 Wu et al.
7,096,266 B2  8/2006 Lewin et al.
(Continued)

FOREIGN PATENT DOCUMENTS

CN  104580177 A  4/2015

OTHER PUBLICATIONS

"Notice of Allowance Issued in U.S. Appl. No. 15/365,733", dated Mar. 27, 2019, 22 Pages.
(Continued)

*Primary Examiner* — Michael A Keller
*Assistant Examiner* — Thao D Duong
(74) *Attorney, Agent, or Firm* — Merchant & Gould

(57) ABSTRACT

The present disclosure provides for improved computational efficiency in systems used to provide content over a network. Hybrid content sourcing is enabled to provide content via a Content Distribution System (CDN) and a centralized service in conjunction with one another via a single URL provided to client devices. Client devices are provided with expiration tokens, which are used to authorize the CDN to request and serve the content to the client devices with the security inherent to the centralized service. Tenants are thereby enabled to use the CDN as an available source via a single Uniform Resource Locator provided to clients with greater security than public CDNs.

20 Claims, 9 Drawing Sheets

(52) U.S. Cl.
CPC .............. *H04L 67/02* (2013.01); *H04L 67/06* (2013.01); *H04L 67/2814* (2013.01); *H04L 67/2842* (2013.01); *H04L 67/2885* (2013.01); *H04L 67/327* (2013.01); *H04L 67/42* (2013.01)

(58) Field of Classification Search
CPC ....... H04L 67/306; H04L 63/10; H04L 67/06; H04L 67/1097; H04L 67/42; H04L 63/08; H04L 63/101; H04L 63/102
See application file for complete search history.

(56) References Cited

U.S. PATENT DOCUMENTS

| | | | |
|---|---|---|---|
| 7,376,716 | B2 | 5/2008 | Dilley et al. |
| 8,397,073 | B1 | 3/2013 | Richardson et al. |
| 8,661,056 | B1 | 2/2014 | Cinarkaya et al. |
| 8,769,614 | B1 | 7/2014 | Knox et al. |
| 9,088,634 | B1 | 7/2015 | Corley et al. |
| 9,160,704 | B2 | 10/2015 | Wein et al. |
| 9,392,075 | B1 | 7/2016 | Radovnikovic |
| 9,549,038 | B1 | 1/2017 | Anne |
| 2002/0163882 | A1 | 11/2002 | Bornstein et al. |
| 2003/0191822 | A1 | 10/2003 | Leighton et al. |
| 2004/0093419 | A1 | 5/2004 | Weihl et al. |
| 2007/0168517 | A1 | 7/2007 | Weller et al. |
| 2008/0155061 | A1 | 6/2008 | Afergan et al. |
| 2009/0254661 | A1 | 10/2009 | Fullagar et al. |
| 2011/0116376 | A1 | 5/2011 | Pacella et al. |
| 2013/0018978 | A1 | 1/2013 | Crowe et al. |
| 2013/0297735 | A1 | 11/2013 | Wein et al. |
| 2014/0059248 | A1 | 2/2014 | Leighton et al. |
| 2014/0108474 | A1 | 4/2014 | David et al. |
| 2014/0115724 | A1 | 4/2014 | van Brandenburg et al. |
| 2014/0173729 | A1 | 6/2014 | Cappos et al. |
| 2014/0181186 | A1 | 6/2014 | Stevens et al. |
| 2014/0189069 | A1 | 7/2014 | Gero et al. |
| 2014/0223017 | A1 | 8/2014 | Lipstone et al. |
| 2014/0372589 | A1 | 12/2014 | Newton et al. |
| 2015/0100660 | A1 | 4/2015 | Flack et al. |
| 2015/0207660 | A1 | 7/2015 | Sundaram et al. |
| 2015/0288647 | A1 | 10/2015 | Chhabra et al. |
| 2016/0057195 | A1 | 2/2016 | Jaskiewicz |
| 2018/0034901 | A1 | 2/2018 | Shnitko et al. |

OTHER PUBLICATIONS

Benchaita, et al., "Stability and optimization of DNS-based request redirection in CDNs", In Proceedings of the 17th International Conference on Distributed Computing and Networking, Jan. 4, 2016, 10 pages.

Walter, et al., "Sandpiper, Akamai Unleash High-Performance Content Delivery", In Journal of Seybold Report on Internet Publishing vol. 3, Issue 12, Aug. 1999, pp. 1-5.

"International Search Report and Written Opinion Issued in PCT Application No. PCT/US2017/050000", dated Nov. 28, 2017, 11 Pages.

"AT&T Content Delivery Network", Retrieved From: <<https://www.business.att.com/content/productbrochures/content-delivery-network.pdf>>, Jan. 21, 2013, 2 Pages.

"How does a CDN work?", Retrieved From: <<https://wpengine.com/support/how-does-a-cdn-work/>>, Retrieved Date: Jul. 13, 2016, 2 Pages.

"Static Content Hosting Pattern Issues and Considerations", Retrieved From: <<https://docs.microsoft.com/en-us/azure/architecture/patterns/static-content-hosting>>, Jun. 7, 2014, 5 Pages.

"Using content delivery networks with SharePoint Online", Retrieved From: <<https://support.office.com/en-us/article/using-content-delivery-networks-with-sharepoint-online-9a64268c-0b74-4eaa-b971-fb6380b1b165>>, Retrieved Date: Jul. 13, 2016, 4 Pages.

Lau, et al., "Best practices to architect applications in the IBM Cloud", Retrieved From: <<http://developeriq.in/articles/2014/sep/05/best-practices-to-architect-applications-in-the-ib/>>, Feb. 15, 2011, 15 Pages.

Mann, Edd, "Providing Local JS and CSS Resources for CDN Fallbacks", Retrieved From: <<http://eddmann.com/posts/providing-local-js-and-css-resources-for-cdn-fallbacks/>>, Jan. 29, 2014, 4 Pages.

O'Brien, Chris, "Office 365 performance—our Azure CDN image renditions solution", Retrieved From: <<http://www.sharepointnutsandbolts.com/2016/03/office-365-performance-cdn-image-renditions-solution.html>>, Mar. 31, 2016, 9 Pages.

O'Brien, Chris, "Office 365 performance—image renditions causing slow page loads in SharePoint Online", Retrieved From <<http://www.sharepointnutsandbolts.com/2016/03/office-365-sharepoint-performance-image-renditions.html>>, Mar. 22, 2016, 9 Pages.

"International Search Report and Written Opinion Issued in PCT Application No. PCT/US2017/041810", dated Oct. 12, 2017, 22 Pages.

Soper, et al., "Pre-load assets on an Azure CDN endpoint", Retrieved From <<https://docs.microsoft.com/en-us/azure/cdn/cdn-preload-endpoint>>, Retrieved Date: Jul. 13, 2016, 3 Pages.

"Office Action Issued in European Patent Application No. 17743443.8", Dated: Mar. 20, 2020, 7 pages.

MOBILE COMPUTING DEVICE

US 10,693,947 B2

INTERCHANGEABLE RETRIEVAL OF SENSITIVE CONTENT VIA PRIVATE CONTENT DISTRIBUTION NETWORKS

CROSS-REFERENCES TO RELATED APPLICATIONS

The present disclosure claims priority to U.S. Provisional Patent Application No. 62/385,801 filed Sep. 9, 2016, the disclosure of which is hereby incorporated by reference in its entirety.

BACKGROUND

Choosing a method to distribute content over the Internet often requires tradeoffs to be made in the speed of delivery and the level of control over that content. Using a central distribution point, such as a central cloud service, allows a content provider greater control over which clients access the content and greater ability to update the content, but clients need to be authenticated and the central service may be located far away from the client—slowing the speed of delivery. Using a content distribution network (CDN), however, allows clients to more quickly access content as edge servers are positioned across a geographic area, but at the expense of the provider's control and ability to update that content because the content needs to be distributed throughout a CDN, and may not include access controls as a result. Developers and providers of content are forced to choose between one method of delivery or another, and changing the delivery method is often unwieldy, time consuming, and resource intensive.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

A hybrid content provisioning system and methods for the use thereof are described in the present disclosure. As described herein, a content provider may designate content to be provided via a central cloud service and content to be provided via a private content distribution network (CDN) and quickly transition which content source provides the content to the clients. The clients are thus provided with content faster than in environments where only a central cloud service is used and the content providers are given greater control over the access rights and ability to provide updated content than in environments where only a CDN is used. By employing the present disclosure, computing devices may improve their functioning by reducing the amount of data that need to be transmitted among each other and reduce the amount of processing resources that need to be expended to share content over the Internet quickly and securely.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
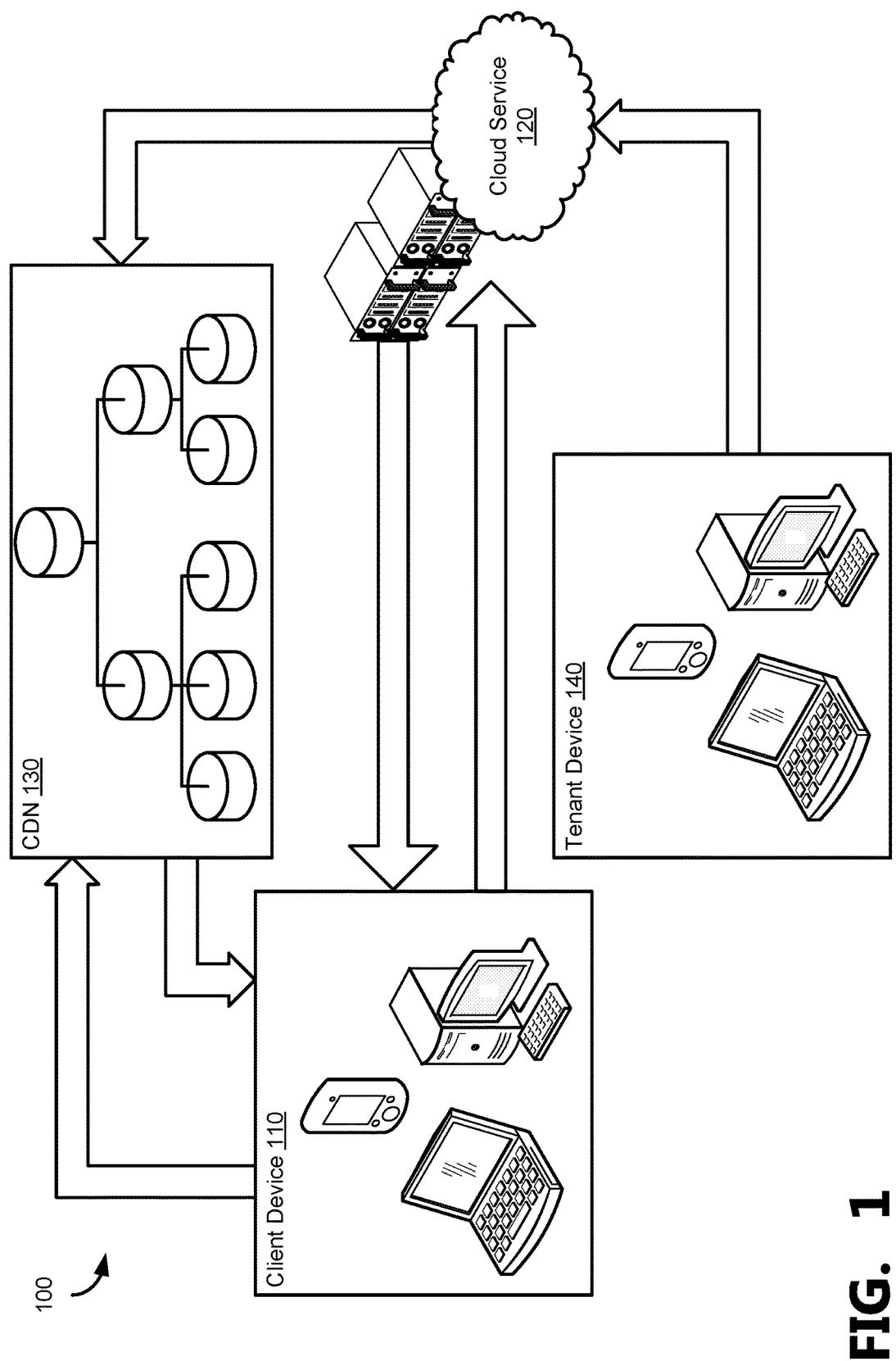
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

A hybrid distribution system and methods that make use of a cloud service and a private content distribution network (CDN) are described herein. The cloud service and the CDN comprise one or more computing devices configured to receive content from the tenant and share it via a network (e.g., the Internet) with authorized clients that request it. The cloud service is a structured service that provides a centralized source for content that may include access controls to that content. The CDN is a content provider that uses the cloud service as its source and distributes the content over a wider geographic area than the cloud service, to provide content faster and with less overhead than the cloud service. The tenant seeking to distribute content is enabled to set which content assets are distributed via the cloud service and which are distributed by the CDN, and may quickly enable or disable the CDN as an available source for content assets without needing to configure how the content is distributed in the CDN and with minimal impact to the client.

FIG. 1 illustrates an example environment 100 in which the present disclosure may be practiced. As illustrated, a client device 110 is operable to communicate requests to the cloud service 120 and to receive content from a cloud service 120 and a CDN 130. The cloud service 120 is in communication with a tenant device 140, by which the content provider may upload or remove content from cloud service 120 and may set how that content is to be made available to the client devices 110. The cloud service 120 is also in communication with the CDN 130 to provide the CDN 130 with the content assets to enable the CDN 130 as an available content source to the client device 110 based on commands from the tenant device 140. In various aspects, the commands from the tenant device 140 that include configuration settings for the CDN 130 may be transmitted directly to the CDN 130 or may be forwarded by the cloud service 120 from the tenant device 140.

The client device 110 and tenant device 140 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 7, 8A, and 8B. Client devices 110 are operated by clients, who may be humans or automated systems (e.g., "bots") that request content. For example, an instance of the SIRI®, GOOGLE NOW™ or CORTANA® electronic assistant (available from Apple, Inc. of Cupertino, Calif.; Alphabet, Inc. of Mountain View, Calif.; and Microsoft, Corp. of Redmond, Wash., respectively) may request content in response to or in anticipation of queries from a human user. Similarly, tenant devices 140 are operated by tenants, who may be humans or automated systems that provide and manage content that is available for clients to request. In various aspects, the tenant and the client may be the same entity, such as, for example, when a developer posts a webpage (as a tenant) and then verifies that the webpage displays properly by visiting (as a client) the live version of that webpage.

The cloud service 120 stores content for the tenant to provide to the client over a network (e.g., the Internet). In various aspects, the cloud service 120 may be operated by the tenant or by a third party on behalf of the tenant at the tenant's direction. The cloud service 120 may be a structured storage service or collaboration tool that is operable to restrict what content is available to certain clients. For example, a tenant may post content that is publically available so that any potential client may request and receive that content, but a tenant may also post content that is only available to a restricted set of potential clients (e.g., private to one entity, shared among a selected whitelist of entities, blocked from sharing according to a blacklist of entities). For example, one or more content items may be hosted in cloud services 120 such as ALFRESCO™ (available from Alfresco Software, Inc. of Atlanta, Ga.), HUDDLE™ (available from Huddle, Inc. of London, UK), GOOGLE DRIVE® (available from Alphabet, Inc. of Mountain View Calif.), WORDPRESS™ (available from Automattic, Inc. of San Francisco, Calif.), SHAREPOINT® (available from Microsoft, Corp. of Redmond, Wash.), but may include other enterprise or personal content management systems.

Content may be organized within the cloud service 120 according to various "libraries," "folders," or "sites" that may have various permission levels. The cloud service 120, when a request for content is received, will determine whether the requesting client is associated with the appropriate permission level to access the requested content, and may require the client device 110 to provide authentication (e.g., an authentication token, a username/password pair) before the requested content is transmitted to the client device 110.

A CDN 130 comprises a series of computing devices arranged in a tiered structure. Content is retrieved from a source (also referred to as a headend or origin) and is cached in progressively lower tiers of computing devices comprising the CDN 130 until the content is cached on an edge server for transmission to a client device 110 requesting that content. The edge servers comprising the CDN 130 are widely distributed geographically so that content can be served to clients with less lag than a single centrally located content source; improving the speed at which content requests are responded to.

When an edge server does not have the content requested by a client, it will request that content from the next higher tier in the CDN 130, which in turn may forward the request to progressively higher tiers until a content source is reached, and the content is distributed through the chain of intermediary servers for provision to the edge server and is transmitted to the client device 110. The servers comprising the CDN 130 may be pre-populated by the administrators of the CDN 130 in anticipation of client requests or may be populated in response to client requests; only those edge servers (and the servers in tiers above them) in communication with clients who have made requests for a given content asset will store the given content asset.

Each server comprising the CDN 130 may cache the content for a different length of time that may be configured by a tenant employing the CDN 130 or an administrator of the CDN 130 to free storage resources when the content item has not been requested for a given length of time or to comply with the retention policy for the content asset. For example, if no clients request a given content item from a first edge server for n days, the content item may be marked to be overwritten on the first edge server or may be deleted from the first edge server, but a second edge server may maintain the content item in its cache independently of the first edge server. Additionally, the next higher tier (from which the first edge server received the content item) may retain the content item for (n+1) days without a client or edge server request for the content item to reduce the amount of data that need to be transferred between tiers of the CDN 130 if the content is requested again from an edge server after n days since the last request.

A CDN 130, unlike the cloud service 120, does not include authentication controls by which a client "logs in" to receive access to content; any requesting client with knowledge of a given Uniform Resource Locator (URL) hosted in the CDN 130 can receive the content asset associated with that URL unless the CDN 130 implements additional controls. In some aspects, the CDN 130 may be managed by the tenant, but in other aspects may instead be a service provided by a third party to distribute the tenant's content more quickly to clients, who may be spread across multiple locations. Examples of third parties that provide CDNs 130 include, but are not limited to: Akamai Techs., Inc. of Cambridge, Mass.; Limelight Networks, Inc. of Tempe, Ariz.; and Level 3 Communications, Inc. of Broomfield, Colo.

As will be appreciated, sensitive content assets (i.e., those assets that the tenant does not want shared with the general public) are stored in the cloud service 120 behind an access control scheme. The hybrid system disclosed herein allows the tenant to extend the access control of the cloud service 120 to the CDN 130, while allowing the client to request the content asset from the most efficient source, to thereby make use of the advantages of each content provisioning system to improve the efficiency and speed of the systems used in accessing content.

The tenant may signal from the tenant device 140 what content assets that are stored in the cloud service 120 are allowed to be privately shared via the CDN 130. In response, the CDN 130 uses the cloud service 120 as its source from which to cache and distribute the assets to appropriate tiers within the CDN 130. The tenant may signal from the tenant device 140 when one or more content assets are no longer allowed to be shared via the CDN 130 by transmitting a cache invalidation request to the CDN 130 and removing the cloud service 120 as a source for the given content assets in the CDN 130. As will be appreciated, the cloud service 120 may also transmit a cache invalidation request while leaving the content asset available from the cloud service 120 to the CDN 130 to force the CDN 130 to request the newest version of a content asset to provide clients with newer or up-to-date versions of that content asset.

The client device 110 accesses the content via a web browser or other application that requests content items according to URLs associated with the content items. As will be appreciated, web browsers often have limits on the number of concurrent requests for content that they may make to a single source, and content requests can often depend from one another; making small improvements to the speed for retrieving an individual content asset have a large impact on content items comprised of many assets. For example, a client accessing a website as a content item may request the webpage itself, which includes the Hypertext Markup Language (HTML) source for the webpage as well as multiple design elements such as JavaScript files, cascading style sheets (CSS), embedded video, audio files, images, etc., which all need to be requested from their associated source, and these elements may further specify other content assets that will later need to be requested (e.g., an image specified within a CSS) for the client to fully receive the content item.

The sensitive content assets are referenced in a parent asset (e.g., a webpage, CSS file) hosted and served by the cloud service 120 behind its access control scheme. The client is validated by the cloud service 120 and for each requested child asset of the parent asset (and grandchild assets), a new URL is generated pointing to the CDN 130 for accessing the sensitive child content assets via the CDN 130. The CDN 130 is configured to extract token and key information from requests using this new URL to request, using these data, permission from the cloud service 120 to the release of content assets to the client using these data. When permission is received, the CDN 130 will release requested content assets that it stores, and will request (for subsequent storage and release) content assets from the cloud service 120 that it does not already store so that the CDN 130 does not need to be prepared/staged for sharing the sensitive content assets; the CDN 130 may be populated at runtime in response to client requests for content assets.

Figure 2:
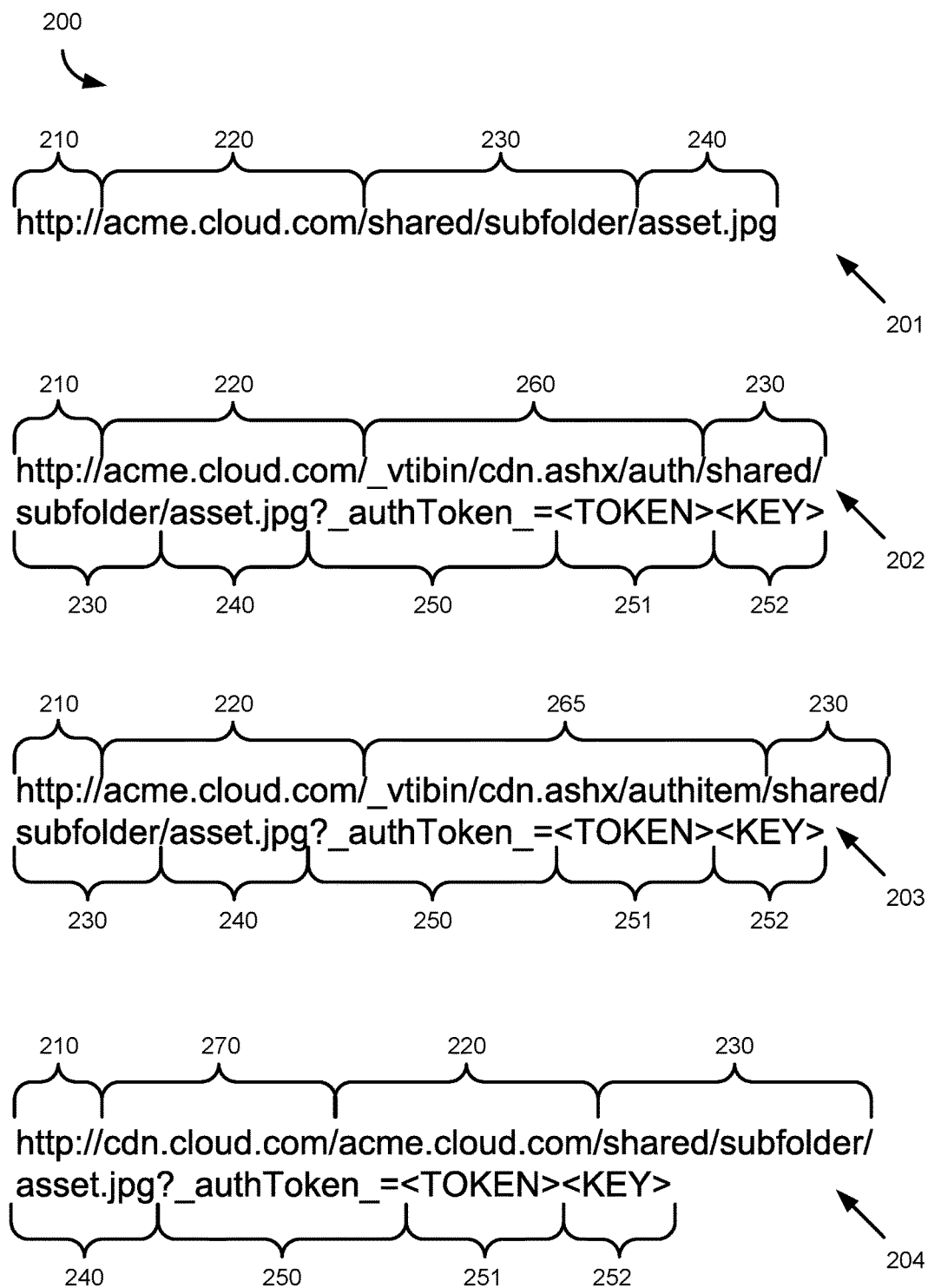
FIG. 2 illustrates an example URL set for a given content asset.

FIG. 2 illustrates an example URL set 200 for a given content asset. Several variations of URLs are discussed herein for retrieving content from various sources, and the example URLs comprising the URL set 200 all point to the same example content asset for purposes of providing non-limiting examples of those URLs and their component elements.

The URL set 200 includes: a cloud URL 201, which points to the content asset as hosted by the cloud source 120; an authorization URL 202, by which the CDN 130 requests authorization from the cloud source 120 to provide sensitive content assets; a source URL 203, from which the CDN 130 receives the sensitive content assets for provision within the CDN 130 for distribution to client devices 110; and a CDN URL 204, at which the CDN 130 hosts the sensitive content assets and by which the client may request the sensitive content assets from the CDN 130.

Each URL of the URL set 200 is comprised of several elements, which include: a scheme 210, identifying a protocol for requesting the asset or specifying that the protocol to-be-used is chosen relative to a currently used protocol (e.g., http://, https://, ftp://, //); a host value 220, pointing to higher divisions of cloud service's URL (e.g., a domain name or IP address); a provided internal file path 230, specifying intermediary portions of cloud service's file path; an asset identifier 240, pointing to a given content asset; a query 250, which includes arguments for an expiration 251 and a key 252 as part of a token to provide limited access to the content asset; and a CDN address 270, that points to the top divisions of the tenant's addresses on the CDN 130. As will be appreciated, the asset identifier 240 may include more than one forward slash delineated segment in various aspects to identify a set of locations and contained assets as a shared library.

When the CDN 130 is a valid source, the cloud source 120 converts the cloud URLs 201 in the parent content asset into the CDN URLs 204 for the client device 110 to request child content assets from the CDN 130. When the CDN 130 is not a valid source, the cloud source 120 provides the cloud URLs 201 for child assets in the parent content asset.

The token, comprising an expiration 251 and a key 252, is integrated into the authorization URL 202, the source URL 203, and the CDN URL 204 as arguments of a query 250 for the sensitive content asset so that the sensitive content asset can be requested, but only for a limited time.

The token is issued by the cloud service 120 to authenticated clients to provide a time limited period in which the client can request sensitive child content assets from the CDN 130. The token is uniquely created for each client and will be valid for a period of time set by the tenant. For example, a token may be generated for a first user and valid for n minutes so that a token may be used to request several content assets (or one content asset multiple times) from the CDN 130 that the first user is authorized to access within n minutes from token creation. As will be appreciated, the shorter the duration for the validity of a token, the more secure the CDN 130 will be in the event that the client shares the token with another client (e.g., via an email), but will encourage the client device 110 to rely on its local cache to avoid needing to query for the asset from the CDN 130, thus reducing network usage.

The expiration 251 of the token is presented as a plaintext time value at which the token is no longer valid. In various aspects, the expiration 251 is provided as a number of millisecond since the Epoch began (an Epoch time) that indicates the time at which the token will expire. The key 252 is generated according to the output of a hash function based on information contained in the cloud URL 201 and a timestamp (or other nonce), and includes the expiration 251 in its calculation of the hash. A hash function yields a one-way encryption of data, which may be done according to various algorithms known to those of ordinary skill in the art (SHA-2, SHA256, MD5, BLAKE2, Keccak, GOST, etc.). In various aspects, the key 252 may include additional information about itself related to: identifying a version of the hash construction rules, a signature or checksum for the key 252, as well as the output of the hash function. The key 252 provides data by which parties may confirm the authenticity of the token, and thereby the authenticity of URLs that include the token.

As part of the creation of the key 252, the cloud service 120 validates that the user requesting the content asset has permission to be provided the content asset in question. When the requesting user has permission, the key 252 will be generated, but when the requesting user does not have permission, the cloud service 120 will not generate the key 252 and the cloud service 120 will instead provide the cloud URL 201, by which the requesting user may negotiate with the cloud service 120 to receive the linked-to content asset. Because the key 252 acts as an anonymous access token, allowing anyone who possesses the key 252 to access the linked-to content asset, the inclusion of the expiration 251 prevents unbounded sharing of the URLs from authorized users to other users (authorized or otherwise) to access those content assets. When the time noted in the expiration 251 is passed, the URL no longer is treated as valid by the CDN 130 or the cloud service 120.

The key 252 is created on the cloud service 120 for the location specified by the tenant device 140 by running the hash function on at least a portion of the cloud URL 201 and a timestamp (or other nonce). In various aspects, to ensure consistent formatting of the cloud URL 201, the cloud URL 201 may be converted to all uppercase, all lowercase, or another normalization of character encodings before being hashed. The entire cloud URL 201 may be hashed, resulting in a unique hash value for each content asset, or only the first X characters (e.g., the host value 220 and at least a portion of the internal file path 270) of the cloud URL 201 to provide hash values that are shared for a given file path. The content asset(s) are then hosted by the cloud service 120 at the source URL 203, and when the CDN 130 is enabled as a content source, the CDN 130 will be provided the CDN URL 204 and will construct the authorization URL 202 and source URL 203 via internal logic to retrieve the content assets from the cloud service 120 as a source to host the content asset(s) in the CDN 130 according to the CDN URL 204.

The CDN URL 204 points to the content asset as it is hosted by the CDN 130 and provides the CDN 130 with the token (including the expiration 251 and key 252) to determine whether the client is authorized to access that content. The CDN URL 204 includes: a scheme 210; a CDN address 270; the host value 220, from the tenant's cloud service 120; the file path 230; the asset identifier 240; and a query 250 including the expiration 251 and key 252 as arguments. In various aspects, the file path 230 may be omitted, modified from that used in the cloud URL 201, or replaced with a hash value to obfuscate the storage pathway used by the cloud service 120.

In response to the CDN 130 receiving a request for the content asset from the client device 110 that includes the CDN URL 204, the CDN 130 is operable to produce the authorization URL 202, to determine from the cloud service 120 whether the client is authorized to access the requested content asset, and the source URL 203, from which to request the content asset if the content asset is not already cached by the CDN 130. Both of the authorization URL 202 and the source URL 203 include: a scheme 210; the host value 220; the file path 230; the asset identifier 240; and a query 250 including the expiration 251 and key 252 as arguments. In various aspects, the file path 230 may be omitted, modified from that used in the cloud URL 201, or replaced with a hash value to obfuscate the storage pathway used by the cloud service 120. In yet other aspects, where the client is granted access to a library of multiple content assets, the asset identifier 240 may be omitted.

The authorization URL 202 differs from the source URL 203 in that the authorization URL 202 includes a client authorization pathway 260, whereas the source URL 203 includes an item authorization pathway 265. The CDN 130 contacts the cloud source 120 via the authorization URL 202 (including the client authorization pathway 260) to pass the expiration 251 and key 252 to the cloud source 120 to determine whether the identified client is authorized to receive the requested content asset or content assets from the identified library. When the token is valid, the CDN 130 will receive authorization from the cloud source 120 and will transmit the content assets to the authorized clients, if the CDN 130 already caches the content assets requested. When the CDN 130 does not cache the content assets requested by the authorized client, the CDN 130 contacts the cloud source 120 via the source URL 203 (including the item authorization pathway 265) to pass the expiration 251 and key 252 to the cloud source 120 to determine whether the identified content asset or library is available for sharing via the CDN 130. When the content asset or library is available for sharing via the CDN 130, the cloud source 120 will pass those requested content assets to the CDN 130 for caching and distribution.

When the given asset is not available for sharing via the CDN 130, or the client is not authorized to receive the content asset from the CDN 130 (e.g., the token is determined to have expired, be missing, or be invalid), the client device 110 receives an error message from the CDN 130 that the content asset is not available from the CDN 130 (e.g., a 404 message). When the CDN 130 is enabled as a content source by the tenant, the content assets may be distributed within the CDN 130 automatically or based on client requests for the content assets at the CDN URLs 204. When the CDN 130 receives a request for a content asset that it does not currently possess, it may send a request to a higher tier within the CDN 130 or the cloud service 120 to retrieve that content asset. If the content cannot be retrieved from a higher tier, or the URL does not point to a valid content asset for the CDN 130 to serve, the CDN 130 will respond to the client device 110 that the CDN 130 is not a valid source (e.g., via a 401, 403, 404, 406, 410, 421, 451 or other network code—see, IETF RFC 7231) and the client device 110 may request the content asset from the cloud service 120 by using the cloud URL 201.

As will be appreciated, the text and order of elements given in the illustrated example may be modified from what is shown in FIG. 2 to meet the needs of various implementations; one of ordinary skill in the art will recognize FIG. 2 and the associated discussion as providing a non-limiting explanation of a URL set 200. The format of the URLs comprising the URL set 200 allows for the conversion from one URL to another. The elements of each URL that are shared in common may be reordered according to a definition provided via tenant-supplied logic (e.g., as part of a CSS or JavaScript file provided from the tenant) to the client device 110 or CDN 130, and any elements that are unique to one URL may similarly be removed or inserted during a conversion based on a definition provided to the client device 110 or CDN 130.

Figure 3:
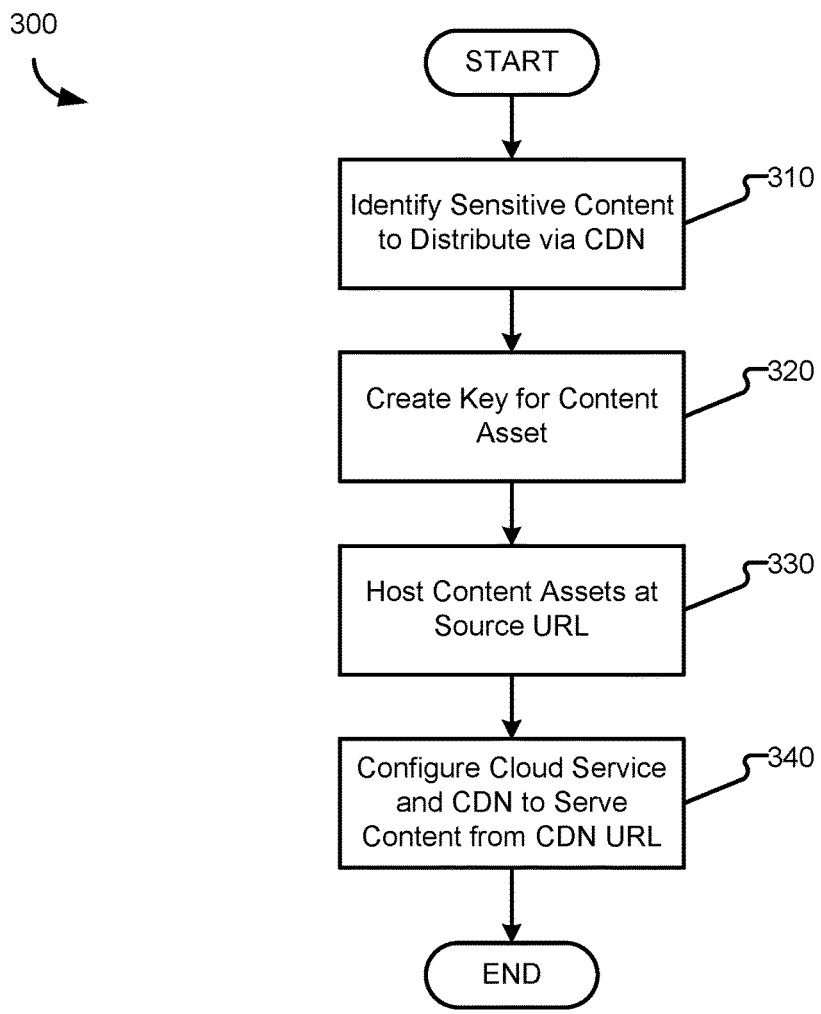
FIG. 3 is a flow chart showing general stages involved in an example method for enabling hybrid content sourcing for the interchangeable retrieval of content when providing a single address.

FIG. 3 is a flow chart showing general stages involved in an example method 300 for enabling hybrid content sourcing for the interchangeable provision of content. Method 300 may be performed in response to the first or a subsequent time that hybrid content sourcing is enabled by a tenant. Content assets may include, as parent assets, links that are formatted as URLs to child content assets or design elements. For example, a content asset of an HTML, CSS, or JavaScript object may reference another content asset via a URL. Content assets provided to client devices 110 may include URLs inserted to link to the content asset as hosted by the cloud service 120 or the CDN 130.

Method 300 begins at OPERATION 310, where a tenant identifies sensitive content to distribute via the CDN 130 to supplement the distribution of content via the cloud service 120. Tenant preferences, received from a tenant device 140, dictate which content assets are identified as to be distributable via a CDN 130.

The identified content will have the URL at which it is hosted for client consumption (i.e., the cloud URL 201) hashed at OPERATION 320, and that hash will be used to create the key 252 for that content asset (or library). In some aspects, the key 252 includes version information, and a checksum or signature in addition to the output of the hash of the cloud URL 201. In yet other aspects, the cloud URL 201 is hashed without an asset identifier 240 so that multiple content assets using similar file paths but for different asset identifiers 240 may use the same key 252.

At OPERATION 330 the key is used to configure the authorization URL 202 and source URL 203 at which the content asset is hosted for provision by the cloud service 120 as a source for the CDN 130. The cloud service 120 will only respond to communications that use the authorization URL 202 and source URL 203 that originate from the CDN 130, and even then only when the tenant has signaled to the cloud service 120 that distribution from the CDN 130 is enabled (OPERATION 340) and it is determined that the client is authorized to access the content asset. When distribution from the CDN 130 is enabled, requests from entities other than the CDN 130 will be rejected, although the cloud service 120 may respond with an Access Denied or other appropriate error code to the requesting entity. Requests from the CDN 130 using the authorization URL 202 or source URL 203 will be verified based on the included expiration 251 and key 252. In some aspects, requests may be identified as originating from the CDN 130 via a whitelist of known IP addresses associated with the CDN 130 or Signature Header Authentication, where headers are signed with a secret that is shared between the cloud service 120 and the CDN 130.

At OPERATION 340 the cloud service 120 and the CDN 130 are configured to enable the CDN 130 to serve content assets. In various aspects, the configuration is signaled from a tenant device 140 to the cloud service 120, which in turn signals the CDN 130 to begin requesting content hosted in the cloud service 120 via the designated source URLs 203. The cloud service 120 may provide the CDN 130 with a list of source URLs 203 and logic on how to convert the source URLs 203 into CDN URLs 204 or the keys 252 and logic to construct the URLs from the URL set 200, retention policies for the content assets in the CDN 130 (e.g., n days), and may provide a shared secret so that requests for content assets from the source URLs 203 may be appropriately signed.

Alternatively, a tenant may provide, via a tenant device 140, the conversion logic, retention policies, or shared secret directly to the CDN 130 or have the cloud service 120 forward those data to the CDN 130. Method 300 may then conclude.

Figure 4:
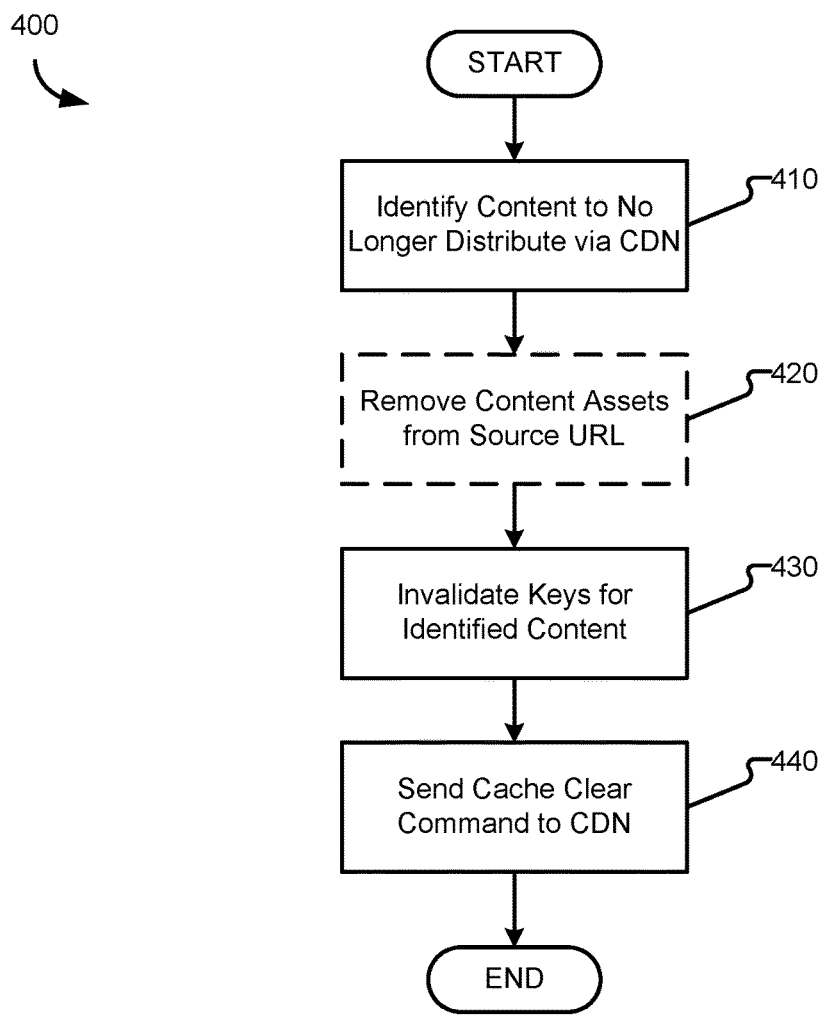
FIG. 4 is a flow chart showing general stages involved in an example method for disabling hybrid content sourcing for the interchangeable retrieval of content when providing a single address.

FIG. 4 is a flow chart showing general stages involved in an example method 400 for disabling hybrid content sourcing for the interchangeable provision of sensitive content. Method 400 may be performed in response to the tenant completely disabling the CDN 130 for content sourcing, or in response to removing one or more specific content assets or libraries of content assets from distribution by the CDN 130.

Method 400 begins at OPERATION 410 where the tenant identifies, via the tenant device 140, to the cloud service 120 content that is no longer to be distributed via the CDN 130 in conjunction with distribution via the cloud service 120. Content assets may be identified individually, if the keys 252 were created to originally share those content assets on a per asset basis, otherwise, if the keys 252 were created to identify libraries from which content assets could be shared, the libraries will be identified to remove from distribution via the CDN 130. As will be appreciated, the tenant may signal one or more content assets or libraries to be removed from distribution via the CDN 130 (up to and including all of the tenant's content) and may re-enable that content for distribution via the CDN 130 at a later time according to method 300.

At optional OPERATION 420 the cloud service 120 stops hosting the identified content assets from the source URLs 203. In various aspects, the source URLs 203 are made unavailable; all requests that use the source URLs 203 will be rejected. Similarly, the associated authorization URLs 202 may also be made unavailable. In other aspects, the authorization URLs 202 and source URLs 203 are deleted from the cloud service 120; the content and content assets are removed. In yet another aspect, a list of clients or tokens that are authorized to request the content assets may be cleared and locked to a null state; preventing any clients from being recognized as authorized for the CDN 130 to cache content for.

At OPERATION 430 the keys 252 for the identified content assets are invalidated to ensure that content assets to-be-purged are not repopulated on the CDN 130 upon user request. Subsequent requests from client devices 110 will be rejected as the CDN URLs 204 that are used to request the content assets will not contain a key 252 that is recognized by the cloud service 120. OPERATION 430 prevents the CDN 130 from repopulating its caches with content assets that are no longer allowed for sharing via the CDN 130.

Proceeding to OPERATION 440, the tenant device 140 sends a cache clear command to the CDN 130, which in some aspects may be received and forwarded by the cloud service 120 from the tenant device 140 to the CDN 130. The cache clear command identifies the content assets that are to be unavailable for distribution from the CDN 130 and causes the CDN 130 to delete those content assets from its storage tiers or otherwise make those content assets unavailable to client devices 110 (e.g., mark for overwriting). As will be appreciated, the tenant may perform OPERATIONS 410 and 440 independently of method 400 to force the CDN 130 to update identified content assets. Method 400 may then conclude.

Figure 5:
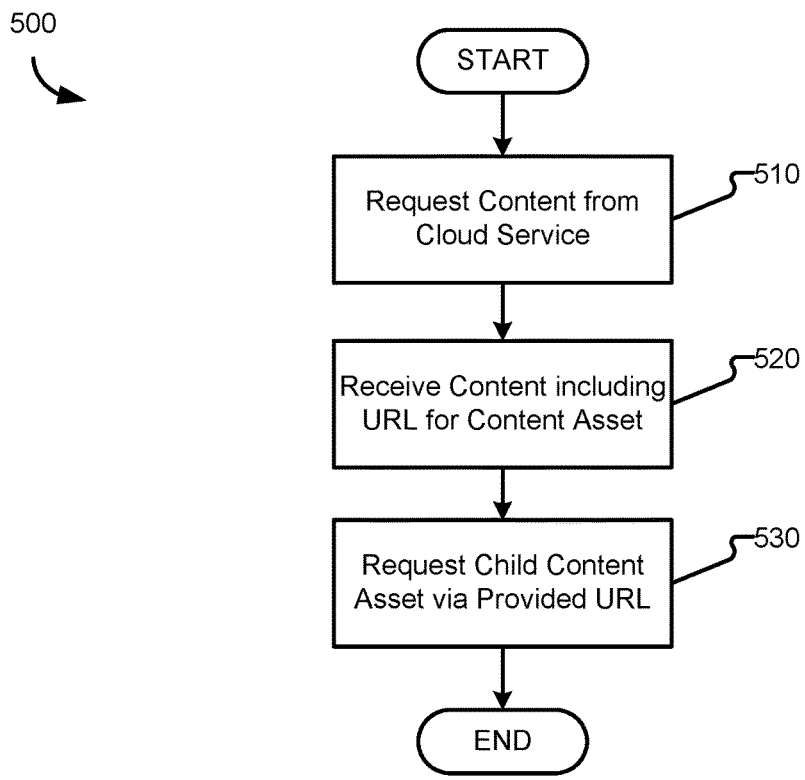
FIG. 5 a flow chart showing general stages involved in an example method for a client device to interchangeably request content assets when provided a single address via hybrid content sourcing.

FIG. 5 is a flow chart showing general stages involved in an example method 500 for a client device 110 to interchangeably request content assets when provided a single address via hybrid content sourcing.

Method 500 begins at OPERATION 510, where the client device 110 transmits a request for content to the cloud service 120. The cloud service 120 will authenticate the client using the client device 110 and may provide content to the client device 110 in response to the request when the client has the appropriate permissions to access the requested content, and otherwise may reject the request. After the cloud service 120 has authenticated the client, the cloud service 120 will determine whether to provide one or more CDN URLs 204 that include an expiration 251 and a key 252 when the CDN 130 is available or one or more associated cloud URLs 201 from the related URL set 200 when the CDN 130 is unavailable, which are included in a parent content asset (e.g., a webpage), which the client device 110 receives at OPERATION 520.

At OPERATION 520 the client device 110 receives a parent content asset including the URLs for child content assets as selected and inserted by the cloud service 120. For example, the client may have requested a webpage (a parent content asset) that includes a URL requesting an image and a CSS (child content assets of the webpage), wherein the CSS requests another image (as a child content asset of the CSS). The cloud service 120 determines whether to provide a cloud URL 201 linking to the child content assets hosted on the cloud service 120 or a CDN URL 204 for retrieving the content asset via the CDN 130.

At OPERATION 530 the client device 110 will request the content asset from the cloud service 120 or the CDN 130 based on the provided URL in the parent content asset. The CDN URL 204 is constructed with the expiration 251 and the key 252 that limits the time period in which the client device 110 may request the child assets from the CDN 130. Method 500 may then conclude.

Figure 6:
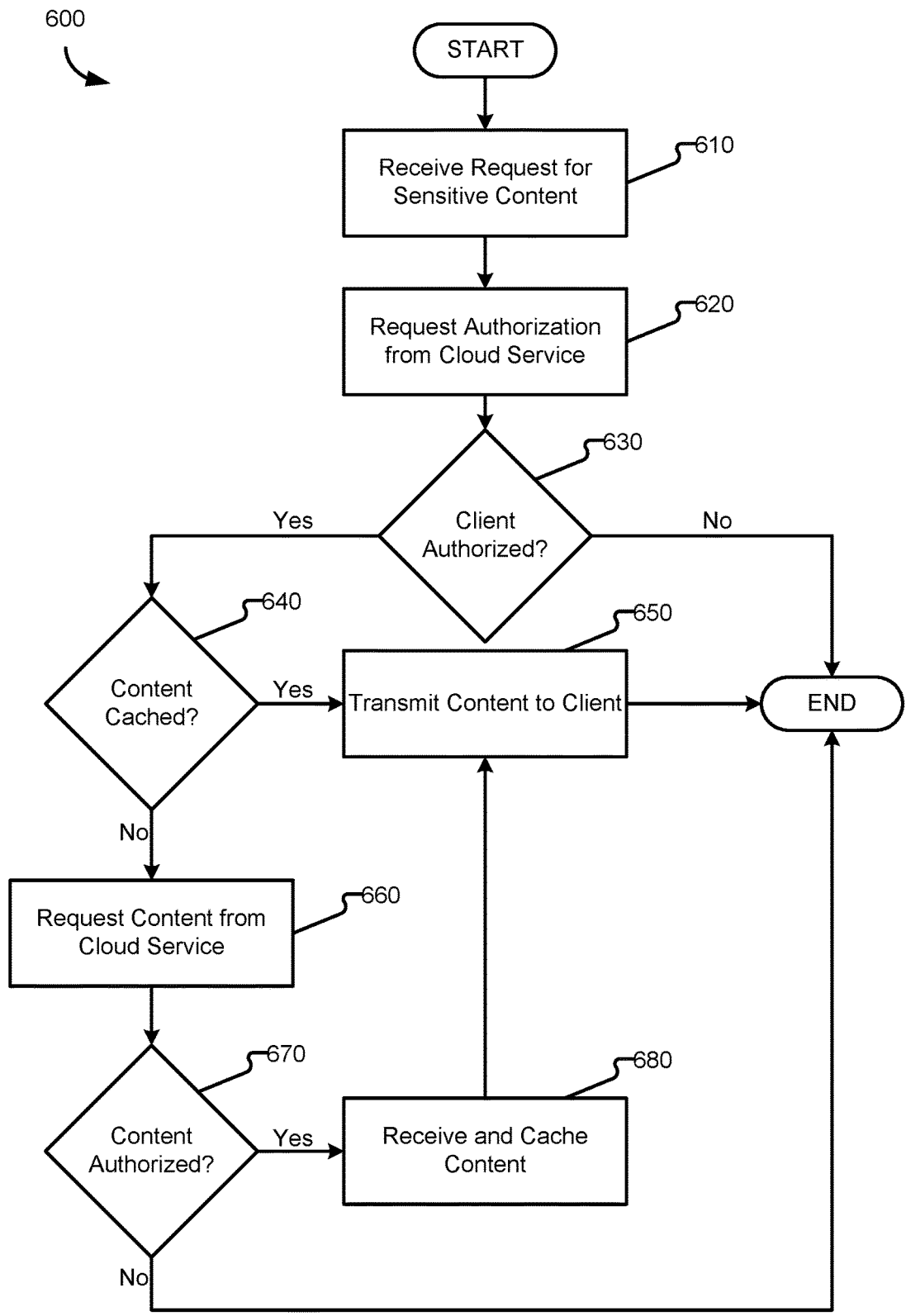
FIG. 6 is a flow chart showing general stages involved in an example method for a CDN to verify whether a requested content asset that is sensitive can be provided to a requesting client.

FIG. 6 is a flow chart showing general stages involved in an example method 600 for a CDN 130 to verify whether a requested content asset that is sensitive can be provided to a requesting client.

Method 600 beings at OPERATION 610, where a request for a content asset is received by the CDN 130 from a client device 110. The request for the content asset includes the CDN URL 204 associated with that content asset, which includes an expiration 251 for the client and a key 252 for the content asset as arguments of its query 250. Method 600 proceeds to OPERATION 620, where authorization to distribute the content asset to the client is requested by the CDN 130 from the cloud service 120. The CDN 130 requests authorization for the client from the cloud service 120 via the authorization URL 202, which includes the client's token including an expiration 251 and the content item's key 252 as elements of the query 250. In various aspects, the CDN 130 issues a HEAD call or similar request to the cloud service 120 for the content asset using the authorization URL 202. The cloud service 120 evaluates the request and attempts to validate the token. When the cloud service 120 validates the token, an authorization code is transmitted to the CDN 130, whereas when the cloud service 120 fails to validate (or invalidates) the token, no authorization code is transmitted to the CDN 130 or an error/failure code is transmitted instead.

At DECISION 630 it is determined by the CDN 130 whether the client is authorized to receive the content asset from the CDN 130. In various aspects, the receipt of an authorization code is used to determine that the client is authorized, while the receipt of an error/failure code or a lack of an authorization code after a predetermined period of time (e.g., a timeout) is used to determine that the client is not authorized. When it is determined that the client is authorized, method 600 proceeds to DECISION 640. Otherwise, when it is determined that the client is not authorized, method 600 may conclude.

The CDN 130 determines whether the requested content has been cached at DECISION 640. When it is determined that the requested sensitive content is already cached with the CDN 130, method 600 proceeds to OPERATION 650. When it is determined that the requested sensitive content is not cached within the CDN 130, method 600 proceeds to OPERATION 660.

At OPERATION 650, the requested content is transmitted to the client device 110 from which the request of OPERATION 610 was received. In various aspects, the content may be cached at a tier above an end server, in which case the CDN 130 may distribute the content asset internally before transmitting the content asset to the client device 110.

When it is determined that the content is not cached in the CDN 130, method 600 proceeds to OPERATION 660, where a request is made to the cloud service 120 for the content assets requested by the client. In various aspects, the CDN 130 issues a GET call or similar request to the cloud service 120 for the content asset using the source URL 203. The cloud service 120 may revalidate the token submitted with the request to determine whether the content asset requested is authorized for sharing with the given client.

At DECISION 670 it is determined whether content that was requested is authorized for distribution by the CDN 130. In various aspects, it may be determined that the content is authorized for distribution when the CDN 130 receives the content asset or a success message from the cloud service 120. In various aspects, it may be determined that the content is not authorized for distribution when the CDN 130 does not receive the content asset or a success message from the cloud service 120 after a set period of time (e.g., the request times out) or a failure message is received by the CDN 130 from the cloud service 120.

When it is determined at DECISION 670 that the content is authorized for distribution by the CDN 130, the CDN 130 receives the content assets from the cloud service 120 and will cache the content assets according to the retention policies and layout of the CDN 130 at OPERATION 680. Method 600 then proceeds to OPERATION 650, where the content asset is transmitted to the client device 110, and method 600 may then conclude.

Otherwise, when it is determined at DECISION 670 that the content asset has not been authorized for distribution by the CDN 130, method 600 may conclude without receiving the content asset from the cloud service 120. In various aspects, when the content asset is not authorized for distribution by the CDN 130, the CDN 130 may receive an error message or a forbidden message from the cloud service 120 indicating that the content asset is not authorized, or the request from CDN 130 may time out and method 600 may then conclude.

Method 600 may conclude without transmitting the content asset to the client device 110 from the CDN 130 in response to DECISION 630 or DECISION 670 determining that either the client or the content asset is not authorized for sharing via the CDN 130. In various aspects, the CDN 130 may optionally provide the client device 110 with an error code, signal to the client device 110 which authorization the client lacks, or signal the client device 110 to request the content asset from the cloud service 120 before method 600 concludes.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
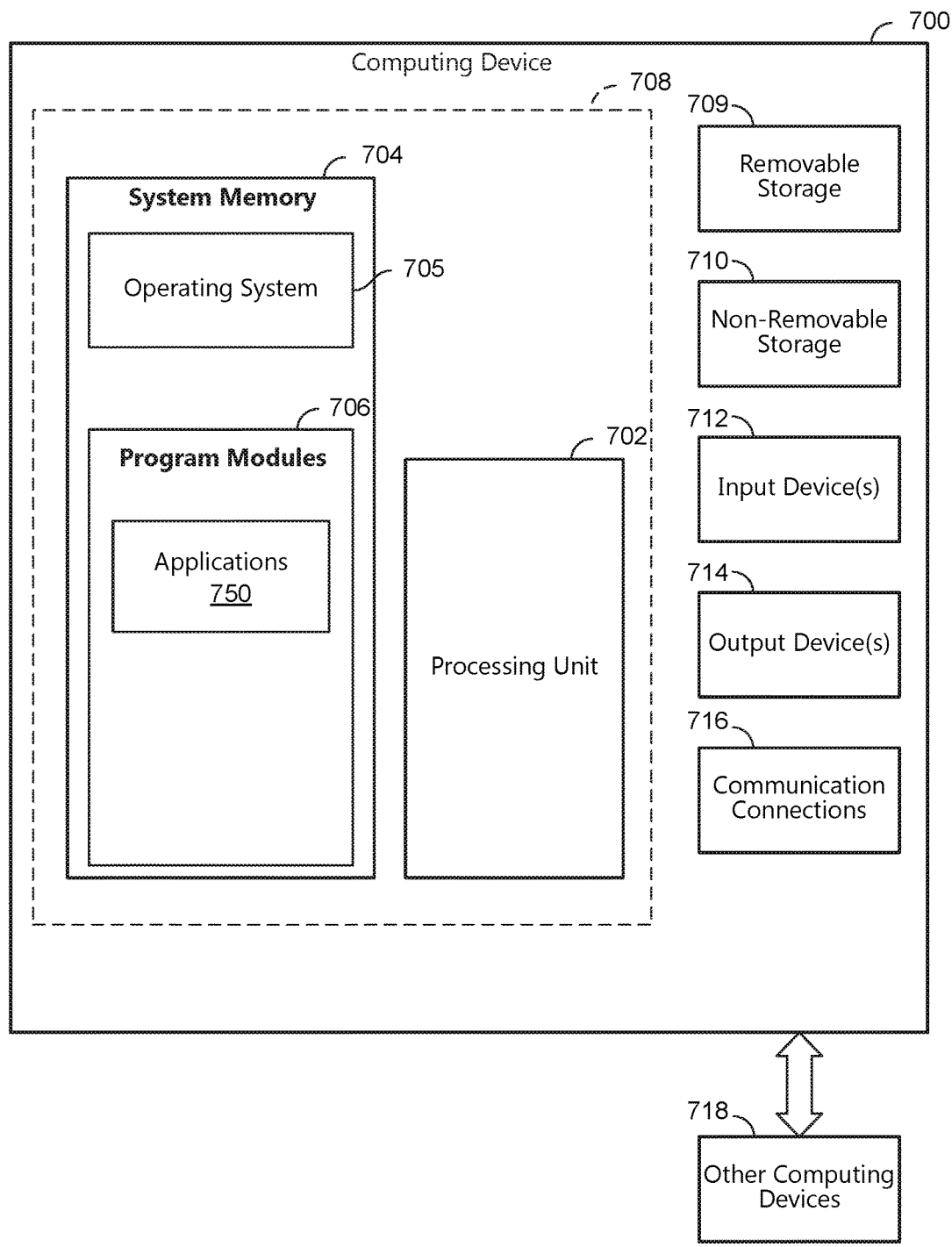
FIG. 7 is a block diagram illustrating example physical components of a computing device.
Figure 8A:
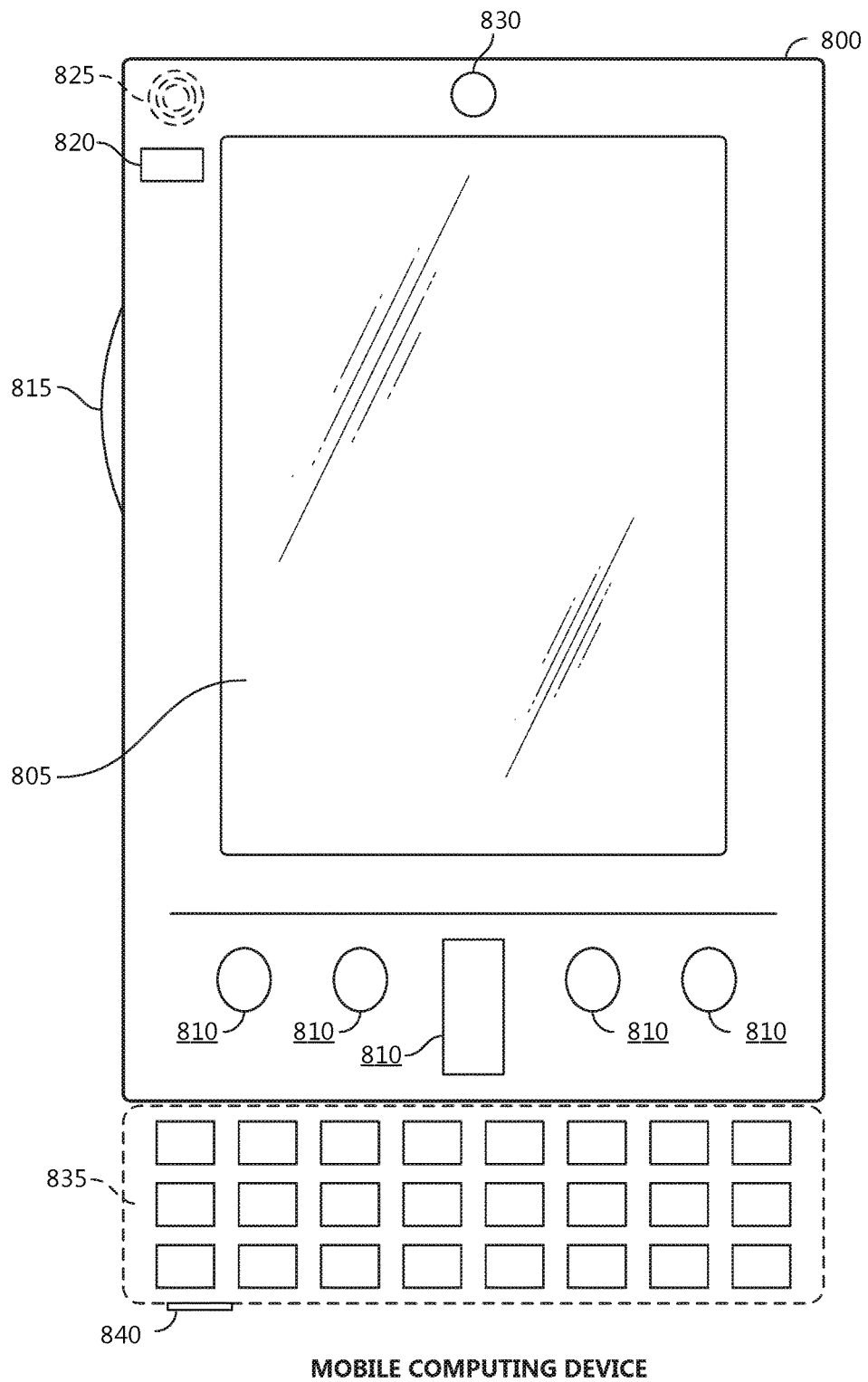
FIGS. 8A and 8B are block diagrams of a mobile computing device.
Figure 8B:
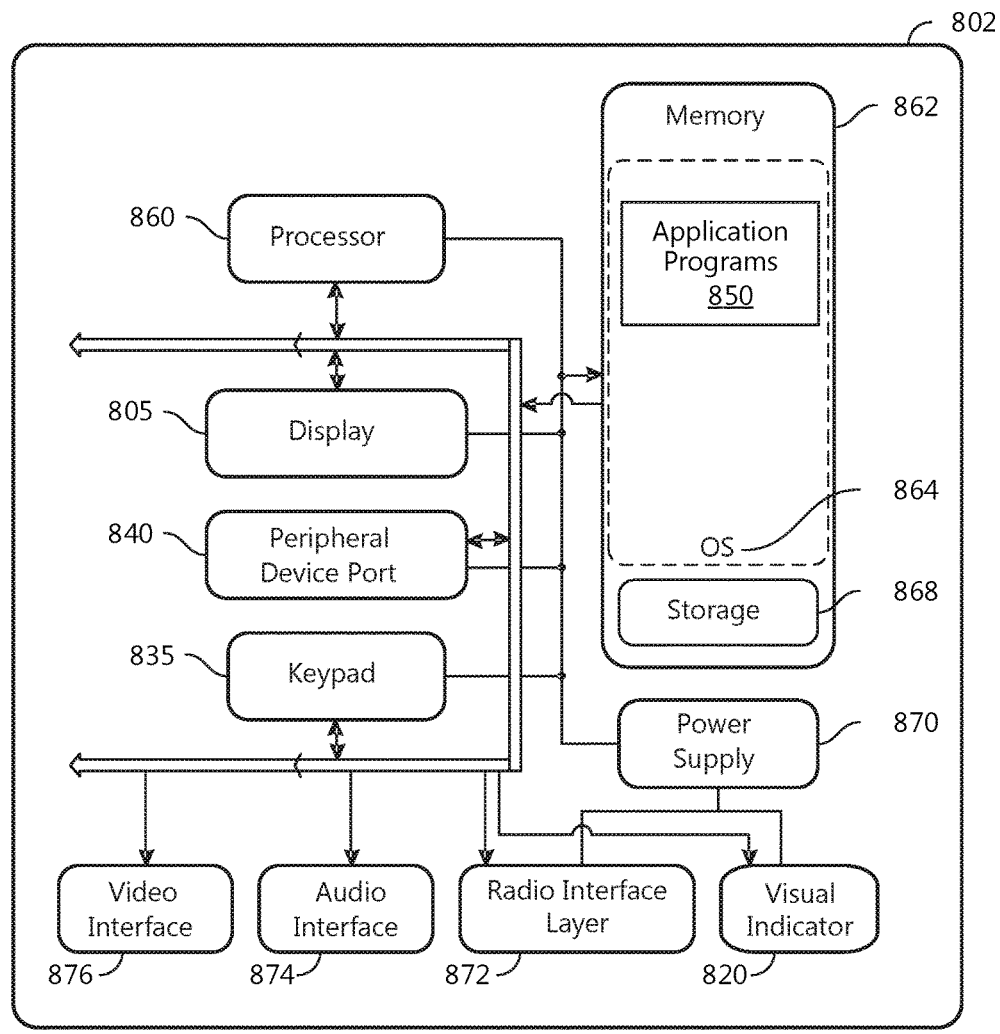

FIGS. 7-8B and the associated descriptions provide a discussion of a variety of operating environments in which examples are practiced. However, the devices and systems illustrated and discussed with respect to FIGS. 7-8B are for purposes of example and illustration and are not limiting of a vast number of computing device configurations that are utilized for practicing aspects, described herein.

FIG. 7 is a block diagram illustrating physical components (i.e., hardware) of a computing device 700 with which examples of the present disclosure may be practiced. In a basic configuration, the computing device 700 includes at least one processing unit 702 and a system memory 704. According to an aspect, depending on the configuration and type of computing device, the system memory 704 comprises, but is not limited to, volatile storage (e.g., random access memory), non-volatile storage (e.g., read-only memory), flash memory, or any combination of such memories. According to an aspect, the system memory 704 includes an operating system 705 and one or more program modules 706 suitable for running software applications 750. According to an aspect, the application 750 includes applications by which a tenant may control the distribution of content assets via a hybrid distribution system or a client may request content according to the present disclosure. The operating system 705, for example, is suitable for controlling the operation of the computing device 700. Furthermore, aspects are practiced in conjunction with a graphics library, other operating systems, or any other application program, and are not limited to any particular application or system. This basic configuration is illustrated in FIG. 7 by those components within a dashed line 708. According to an aspect, the computing device 700 has additional features or functionality. For example, according to an aspect, the computing device 700 includes additional data storage devices (removable and/or non-removable) such as, for example, magnetic disks, optical disks, or tape. Such additional storage is illustrated in FIG. 7 by a removable storage device 709 and a non-removable storage device 710.

As stated above, according to an aspect, a number of program modules and data files are stored in the system memory 704. While executing on the processing unit 702, the program modules 706 (e.g., applications 750) perform processes including, but not limited to, one or more of the stages of the methods 300, 400, and 500 illustrated in FIGS. 3-5. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 700 has one or more input device(s) 712 such as a keyboard, a mouse, a pen, a sound input device, a touch input device, etc. The output device(s) 714 such as a display, speakers, a printer, etc. are also included according to an aspect. The aforementioned devices are examples and others may be used. According to an aspect, the computing device 700 includes one or more communication connections 716 allowing communications with other computing devices 718. Examples of suitable communication connections 716 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. According to an aspect, any such computer storage media is part of the computing device 700. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which aspects may be practiced. With reference to FIG. 8A, an example of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. According to an aspect, the display 805 of the mobile computing device 800 functions as an input device (e.g., a touch screen display). If included, an optional side input element 815 allows further user input. According to an aspect, the side input element 815 is a rotary switch, a button, or any other type of manual input element. In other examples, mobile computing device 800 incorporates more or fewer input elements. For example, the display 805 may not be a touch screen in some examples. In other examples, the mobile computing device 800 is a portable phone system, such as a cellular phone. According to an aspect, the mobile computing device 800 includes an optional keypad 835. According to an aspect, the optional keypad 835 is a physical keypad. According to another aspect, the optional keypad 835 is a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 800 incorporates peripheral device port 840, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 incorporates a system (i.e., an architecture) 802 to implement some examples. In one example, the system 802 is implemented as a "smart phone" capable of running one or more applications (e.g., browser, e-mail, calendaring, contact managers, messaging clients, games, and media clients/players). In some examples, the system 802 is integrated as a computing device, such as an integrated personal digital assistant (PDA) and wireless phone.

According to an aspect, one or more application programs 850 are loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 is used to store persistent information that should not be lost if the system 802 is powered down. The application programs 850 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

According to an aspect, the system 802 has a power supply 870, which is implemented as one or more batteries. According to an aspect, the power supply 870 further includes an external power source, such as an AC adapter or a powered docking cradle that supplements or recharges the batteries.

According to an aspect, the system 802 includes a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

According to an aspect, the visual indicator 820 is used to provide visual notifications and/or an audio interface 874 is used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. According to an aspect, the system 802 further includes a video interface 876 that enables an operation of an on-board camera 830 to record still images, video stream, and the like.

According to an aspect, a mobile computing device 800 implementing the system 802 has additional features or functionality. For example, the mobile computing device 800 includes additional data storage devices (removable and/or non-removable) such as, magnetic disks, optical disks, or tape. Such additional storage is illustrated in FIG. 8B by the non-volatile storage area 868.

According to an aspect, data/information generated or captured by the mobile computing device 800 and stored via the system 802 are stored locally on the mobile computing device 800, as described above. According to another aspect, the data are stored on any number of storage media that are accessible by the device via the radio 872 or via a wired connection between the mobile computing device 800 and a separate computing device associated with the mobile computing device 800, for example, a server computer in a distributed computing network, such as the Internet. As should be appreciated such data/information are accessible via the mobile computing device 800 via the radio 872 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and other examples falling within the spirit of the broader aspects of the general inventive concept embodied in this application that do not depart from the broader scope.

We claim:

1. A method for improving computational efficiency in interchangeably sourcing content for retrieval when providing a single address, comprising:
   identifying a content asset to be distributed via a CDN (Content Distribution Network) in conjunction with a cloud service hosting the content asset at a provided URL (Uniform Resource Locator);
   creating a key value based on the provided URL;
   hosting, at the cloud service, a child content asset of the content asset at a cloud URL and a source URL, wherein the source URL includes the key value;
   creating, by the cloud service, a CDN URL, wherein the CDN URL points to an address for the CDN to provide the child content asset to a client device and the CDN URL includes the key value;
   providing, from the cloud service to a client device, an authentication token associated with a client and the key value;
   receiving an authorization request from the CDN to distribute the child content asset to the client device, the authorization request including the key value and the authentication token;
   verifying the authentication token; and
   transmitting, from the cloud service, an authorization code to the CDN to enable the CDN to distribute the child asset to the client device.

2. The method of claim 1, wherein creating the key value comprises:
   setting an expiration time for the authorization token;
   generating a nonce; and
   hashing a combination of the expiration time, the nonce, and at least a portion of the cloud URL.

3. The method of claim 1, wherein the authentication token includes a plaintext expiration indicating a time after which the authentication token is no longer valid.

4. The method of claim 1, wherein the content asset is provided to the client device from the cloud service in response cloud service authorizing the client device to receive the content asset.

5. The method of claim 1, further comprising:
   identifying a given child asset that is currently distributed via the CDN in conjunction with the cloud service that is no longer to be distrusted via the CDN;
   removing the given child asset from hosting by the cloud service at a given source URL associated with the given child asset;
   sending, from the cloud service, a cache clear command to the CDN; and
   invalidating the authentication token.

6. The method of claim 1, wherein a plurality of child content items organized into a library share a given key value.

7. The method of claim 1, wherein the cloud service is configured to reject requests for the child asset via the source URL that are received from requesting parties other than the CDN.

8. The method of claim 1, wherein the cloud URL comprises:
   a protocol identifier;
   a host value;
   a provided internal file path; and
   an asset identifier for the child asset.

9. The method of claim 8, wherein the source URL comprises:
   the protocol identifier;
   the host value;
   an item authorization pathway;
   the provided internal file path; and
   the asset identifier for the child asset; and
   a query, including the key value.

10. The method of claim 8, wherein the CDN URL comprises:
    the protocol identifier;
    a CDN address;
    the host value;
    the provided internal file path;
    the asset identifier for the child asset; and
    a query, including the key value.

11. A system for improving computational efficiency in interchangeably sourcing content for retrieval when providing a single address, comprising:
    a processing unit; and
    a memory including computer readable instructions, which when executed by the processor, causes the system to be operable to:
    identify a content asset to be distributed via a CDN (Content Distribution Network) in conjunction with a cloud service hosting the content asset at a provided URL (Uniform Resource Locator);
    create a key value based on the provided URL;
    host, at the cloud service, a child content asset of the content asset at a cloud URL and a source URL, wherein the source URL includes the key value;
    create, by the cloud service, a CDN URL, wherein the CDN URL points to an address for the CDN to provide the child content asset to a client device and the CDN URL includes the key value;
    provide, from the cloud service to a client device, an authentication token associated with a client and the key value;
    receive an authorization request from the CDN to distribute the child content asset to the client device, the authorization request including the key value and the authentication token;

verify the authentication token; and transmit, from the cloud service, an authorization code to the CDN to enable the CDN to distribute the child asset to the client device.

12. The system of claim 11, wherein creating the key value comprises the system being further operable to:
set an expiration time for the authorization token;
generate a nonce; and
hash a combination of the expiration time, the nonce, and at least a portion of the cloud URL.

13. The system of claim 11, wherein the authentication token includes a plaintext expiration indicating a time after which the authentication token is no longer valid.

14. The system of claim 11, wherein the content asset is provided to the client device from the cloud service in response cloud service authorizing the client device to receive the content asset.

15. The system of claim 11, wherein the system is further operable to:
identify a given child asset that is currently distributed via the CDN in conjunction with the cloud service that is no longer to be distrusted via the CDN;
remove the given child asset from hosting by the cloud service at a given source URL associated with the given child asset;
send, from the cloud service, a cache clear command to the CDN; and
invalidate the authentication token.

16. A computer readable storage medium including computer readable instructions, which when executed by a processing unit, perform the steps for improving computational efficiency in interchangeably sourcing content for retrieval when providing a single address, comprising:
identifying a content asset to be distributed via a CDN (Content Distribution Network) in conjunction with a cloud service hosting the content asset at a provided URL (Uniform Resource Locator);
creating a key value based on the provided URL;
hosting, at the cloud service, a child content asset of the content asset at a cloud URL and a source URL, wherein the source URL includes the key value;
creating, by the cloud service, a CDN URL, wherein the CDN URL points to an address for the CDN to provide the child content asset to a client device and the CDN URL includes the key value;
providing, from the cloud service to a client device, an authentication token associated with a client and the key value;
receiving an authorization request from the CDN to distribute the child content asset to the client device, the authorization request including the key value and the authentication token;
verifying the authentication token; and
transmitting, from the cloud service, an authorization code to the CDN to enable the CDN to distribute the child asset to the client device.

17. The computer readable storage medium of claim 16, wherein a plurality of child content items organized into a library share a given key value.

18. The computer readable storage medium of claim 16, wherein the cloud service is configured to reject requests for the child asset via the source URL that are received from requesting parties other than the CDN.

19. The computer readable storage medium of claim 16, wherein the cloud URL comprises:
a protocol identifier;
a host value;
a provided internal file path; and
an asset identifier for the child asset.

20. The computer readable storage medium of claim 19, wherein the source URL comprises:
the protocol identifier;
the host value;
an item authorization pathway;
the provided internal file path; and
the asset identifier for the child asset; and
a query, including the key value.

* * * * *